(12) United States Patent
Parkes et al.

(10) Patent No.: US 8,668,237 B2
(45) Date of Patent: Mar. 11, 2014

(54) FLEXIBLE PLUMBING ASSEMBLY FOR A VEHICLE

(75) Inventors: Eric John Parkes, Junction City, OR (US); Dale I. Allen, Jr., Creswell, OR (US)

(73) Assignee: Monaco RV, LLC, Decatur, IN (US)

( * ) Notice: Subject to any disclaimer, the term of this patent is extended or adjusted under 35 U.S.C. 154(b) by 0 days.

(21) Appl. No.: 13/698,099

(22) PCT Filed: May 21, 2010

(86) PCT No.: PCT/US2010/035743
§ 371 (c)(1),
(2), (4) Date: Nov. 15, 2012

(87) PCT Pub. No.: WO2011/146072
PCT Pub. Date: Nov. 24, 2011

(65) Prior Publication Data
US 2013/0062906 A1 Mar. 14, 2013

(51) Int. Cl.
*B60R 15/00* (2006.01)
(52) U.S. Cl.
USPC ........................................ 296/26.13; 296/156
(58) Field of Classification Search
USPC ............ 296/156, 176, 26.01, 26.13, 2, 26.09, 296/26.08
See application file for complete search history.

(56) References Cited

U.S. PATENT DOCUMENTS

| 5,620,224 | A | 4/1997 | DiBiagio |
| 5,658,031 | A | 8/1997 | DiBiagio |
| 5,816,639 | A | 10/1998 | DiBiagio |
| 5,951,082 | A * | 9/1999 | DiBiagio et al. ............ 296/26.13 |
| 7,506,661 | B2 * | 3/2009 | Corrigan et al. .......... 137/355.16 |
| 7,802,834 | B2 | 9/2010 | Cadena |
| 2002/0047291 | A1 * | 4/2002 | Crean ........................... 296/168 |
| 2006/0131912 | A1 * | 6/2006 | MacLean ................... 296/26.13 |
| 2008/0265618 | A1 | 10/2008 | Cadena |
| 2013/0062906 | A1 | 3/2013 | Parkes |

OTHER PUBLICATIONS

Published PCT application from parent application.
PCT report from parent application.

* cited by examiner

*Primary Examiner* — Glenn Dayoan
*Assistant Examiner* — Pinel Romain
(74) *Attorney, Agent, or Firm* — Hovey Williams LLP

(57) ABSTRACT

A flexible plumbing assembly for a vehicle having a main cabin portion with an extensible cabin portion that is moveable between a retracted position and an extended position includes a flexible hose having a fixed end connected to the fixed cabin portion and a moveable end connected to the movable cabin portion. The flexible plumbing assembly also includes a sliding structure for facilitating movement of the movable end with respect to the fixed end as the extensible cabin portion moves between the extended and retracted positions. The flexible hose and the sliding structure are disposed in a floor of the extensible cabin portion.

18 Claims, 4 Drawing Sheets

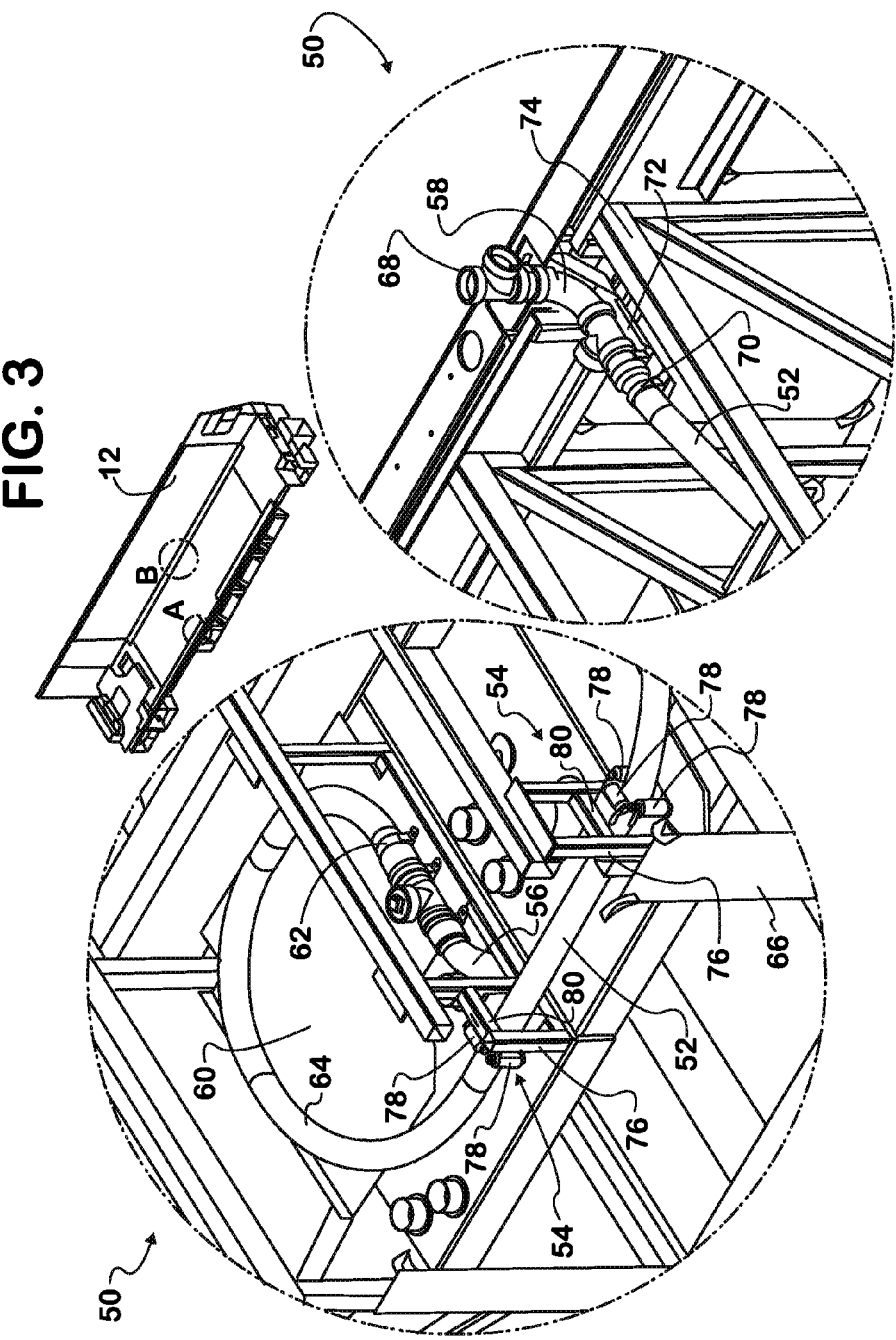

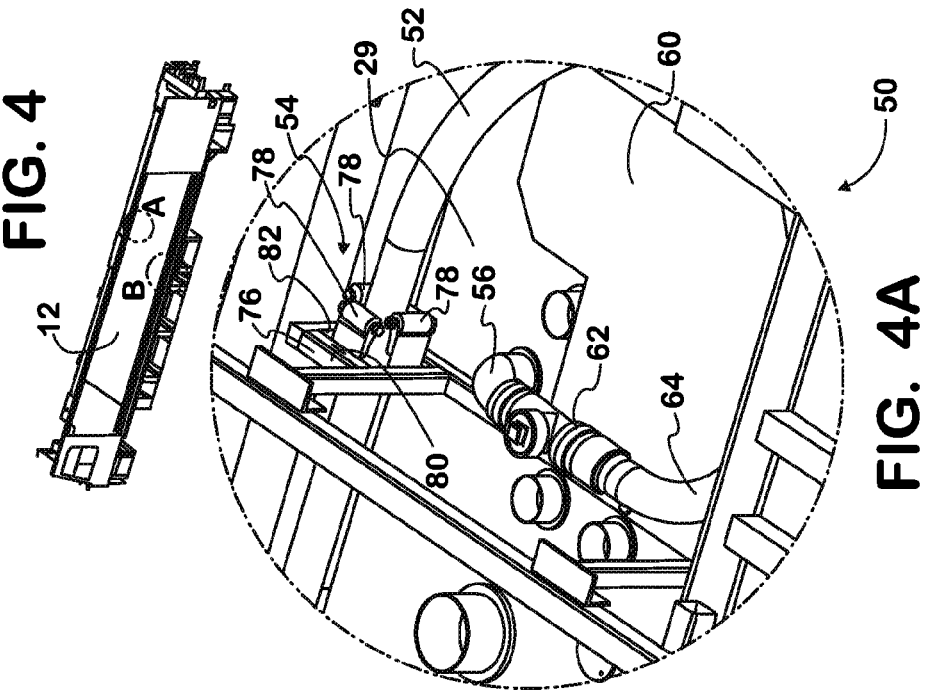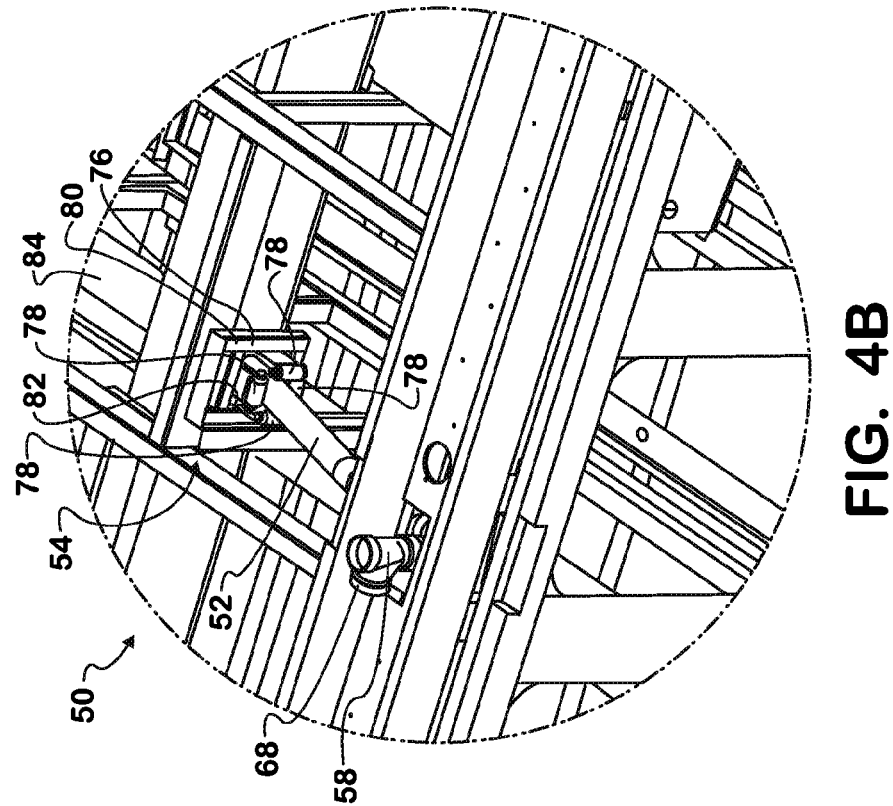

FLEXIBLE PLUMBING ASSEMBLY FOR A VEHICLE

BACKGROUND

Embodiments described herein relate to a flexible plumbing assembly and method of plumbing, and more particularly, to a flexible plumbing assembly and method of plumbing vehicles having an extensible cabin portion.

Vehicles such as motor coaches and travel trailers often have a main cabin portion and an extensible cabin portion that extends from the main cabin portion to increase the interior area of the vehicle. The extensible cabin portion typically slides along the floor of the main cabin portion between a retracted position and an extended position, while the main cabin portion does not move.

Rigid plumbing is typically used for waste disposal lines, water lines and gas lines. To facilitate the placement of rigid plumbing, the kitchen and bathroom areas of the vehicle typically have to be located in the main cabin portion, and the extensible cabin portion is typically used for sleeping and living areas. In this way, the total interior area of the cabin that is used, and the configuration of the entire cabin is limited to where the kitchen and bathroom areas are located.

Some prior art vehicles have located the kitchen and bathroom areas in the extensible cabin portions by providing connection to utility lines with quick release connectors. However, the quick release connectors are manually connected and disconnected each time the extensible cabin portion is moved from the retracted position to the extended position, or from the extended position to the retracted position.

Flexible plumbing assemblies have also been used to locate the kitchen and bathroom areas in the extensible cabin portion. As taught by U.S. Pat. Nos. 5,816,639 and 5,951,082 assigned to Monaco Coach Corporation, flexible plumbing has been located within a slide cabinet on a side wall of the extensible cabin portion. The slide cabinet is positioned in a hollow interior space of the wall, and the plumbing fixture is located adjacent to the wall containing the slide cabinet so that the plumbing lines can be fed into the wall and into the slide cabinet.

SUMMARY

A flexible plumbing assembly for a vehicle having a main cabin portion with an extensible cabin portion that is moveable between a retracted position and an extended position includes a flexible hose having a fixed end connected to the fixed cabin portion and a moveable end connected to the movable cabin portion. The flexible plumbing assembly also includes a sliding structure for facilitating movement of the movable end with respect to the fixed end as the extensible cabin portion moves between the extended and retracted positions. The flexible hose and the sliding structure are disposed in a floor of the extensible cabin portion.

Another flexible plumbing assembly for a vehicle having a main cabin portion with an extensible cabin portion that is moveable between a retracted position and an extended position includes a flexible hose having a fixed end connected to the fixed cabin portion and a moveable end connected to the movable cabin portion. The flexible plumbing assembly includes at least one bracket structure having at least one roller for engaging the flexible hose and facilitating movement of the movable end with respect to the fixed end as the extensible cabin portion moves between the extended and retracted positions. The bracket structure holds the flexible hose at a grade substantially along the length of the flexible hose regardless of the location and movement of the extensible cabin portion between the extended and retracted positions.

A method of facilitating movement of a flexible hose of a flexible plumbing assembly when an extensible cabin portion of a vehicle is moved from a retracted position to an extended position includes the steps of disposing the flexible hose and at least one bracket structure within a hollow interior of a floor of the extensible cabin portion, and extending the flexible hose from the fixed end to the moveable end and through at least one opening in the bracket structure. The method also includes the step of engaging at least one roller on the flexible hose at the bracket structure.

BRIEF DESCRIPTION OF THE DRAWINGS

FIG. 3 is a perspective view of the extensible cabin portion.

FIG. 3A is a detail view of the flexible plumbing assembly at location A of FIG. 3.

FIG. 3B is a detail view of the flexible plumbing assembly at location B of FIG. 3.

FIG. 4 is an opposite side perspective view of the extensible cabin portion.

FIG. 4A is a detail view of the flexible plumbing assembly at location A of FIG. 4.

FIG. 4B is a detail view of the flexible plumbing assembly at location B of FIG. 4.

DETAILED DESCRIPTION

Figure 1:
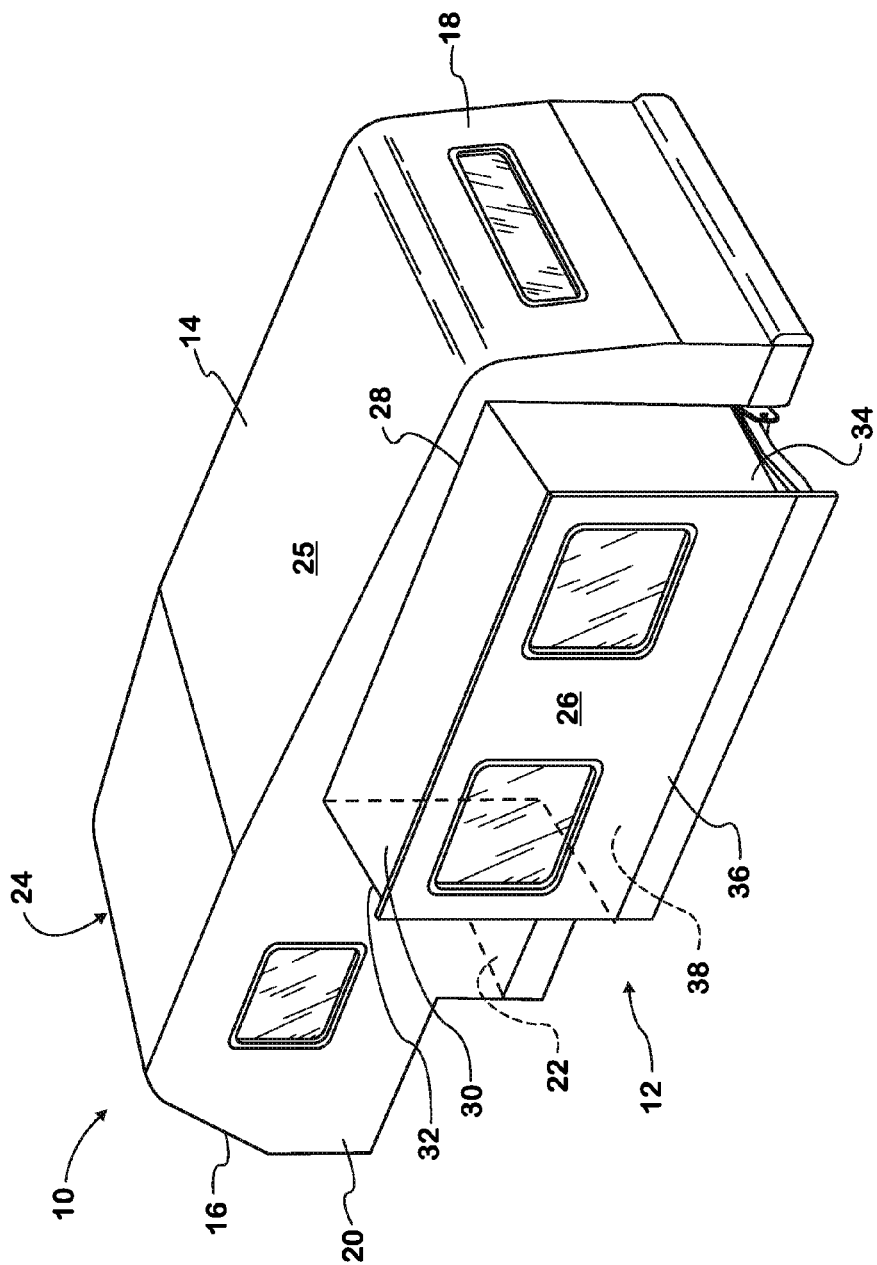
FIG. 1 is a perspective view of a vehicle with an extensible cabin portion in the extended position.
Figure 2:
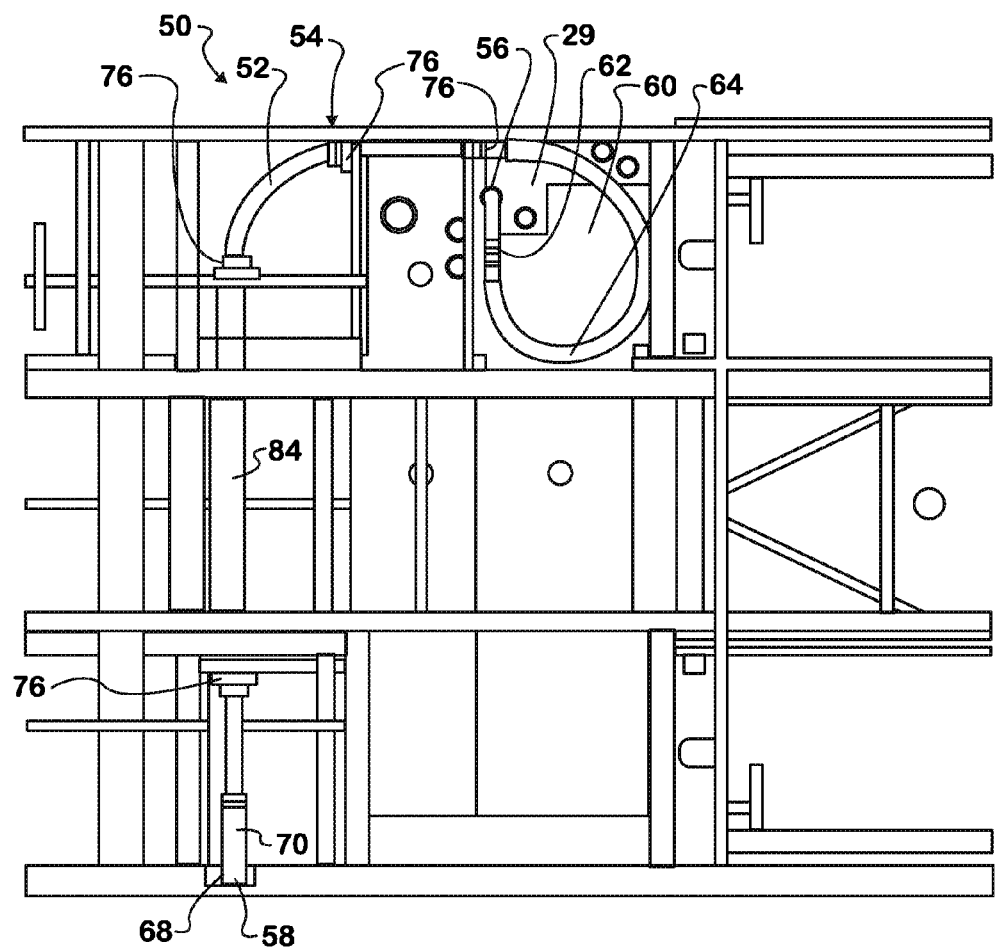
FIG. 2 is a top view of a floor of the vehicle having a flexible plumbing assembly.

Referring to FIGS. 1-4B, a vehicle 10 has an extensible cabin portion 12 and a slideout mechanism (not shown), and a flexible plumbing assembly 50. Although the illustrated vehicle 10 is of the towable "fifth wheel" trailer type, it will be appreciated that the flexible plumbing assembly 50 is applicable to any type of expandable vehicle or trailer. Further, the flexible plumbing assembly 50 services plumbing fixtures, including but not limited to kitchen and bathroom fixtures, such as galleys, sinks, toilets and appliances, however other fixtures are possible.

The vehicle 10 generally has a ceiling 14, a front wall 16, a rear wall 18, two opposing side walls 20, and a floor 22 that generally defines a main cabin portion 24 having a main cabin space 25. In the illustrated embodiment, the left side wall 20 has an opening 28 for receiving the extensible cabin 12. The extensible cabin 12 has a cabin ceiling 30, a front wall 32, a rear wall 34, side wall 36 and a floor 38. The extensible cabin 12 defines an extensible cabin space 26.

The extensible cabin 12 is movable between an extended position generally shown in FIG. 1 and a retracted position where the side wall 36 is generally flush with side wall 20. In the extended position, the extensible cabin 12 is extended outwardly from the main cabin portion 24 which increases an overall space that is available inside the vehicle 10, where the overall space is equal to the main space 20 plus the extensible cabin space 26. In the retracted position, the cabin 12 is positioned inwardly into the main cabin space 25 of the vehicle 10 which decreases the exterior dimensions of the vehicle 10 for towing and transport over the highways. The slideout mechanism (not shown) of the vehicle 10 positions the extensible cabin portion 12 between the retracted and extended positions. The extensible cabin portion 12 may also drop vertically so that the floor 38 of the extensible cabin is generally flush with the floor 22 of the main cabin portion 24. The extensible cabin portion 12 may move vertically about 2-inches, and may move horizontally about 14 to 32-inches, however other distances are possible.

The vehicle 10 has a flexible plumbing assembly 50 for maintaining the connection between plumbing in the main cabin portion 24 and the extensible cabin portion 12 while the extensible cabin portion moves between the extended position and the retracted position. The vehicle plumbing assembly 50 may include one or more tanks 29, such as water tanks, propane supply tanks, and/or storage tanks for waste water and other waste material disposed in the vehicle 10. Further, the plumbing assembly 50 may include hot and cold water supply lines and drain lines for sinks and a shower, propane supply lines for a gas stove, or drain lines for waste material in the extensible cabin portion 12.

The flexible plumbing assembly 50 includes a flexible hose 52 that is made of a flexible material that can bend to accommodate the movement of the extensible cabin portion 12 between the retracted and the extended positions. The flexible hose may connect rigid drain plumbing in the extensible cabin portion to rigid drain plumbing in the fixed cabin portion.

The flexible hose 52 may be made from any flexible material such as PVC, among other materials. The diameter of the flexible hose 52 may be dependent on the size of the vehicle, the type of interior plumbing, and the capacity of the plumbing fixtures, and can range from about ¼ inch to about 6 inches, however other sizes are possible. The length of the flexible hose 52 is sufficient to reach the plumbing fixture on the extensible cabin portion 12 when the extensible cabin portion is fully extended.

The flexible plumbing assembly 50 also includes a sliding structure 54 for sliding the flexible hose 52 to and from a fixed end 56 and a moveable end 58. The flexible hose 52 and the sliding structure 54 may both be located in the hollow interior of the floor 38 of the extensible cabin portion 12 and the floor 22 of the main cabin portion 24. The fixed end 56 is disposed in the floor 22 of the fixed main cabin portion 24, and the moveable end 58 of the flexible hose 52 is disposed in the floor 38 of the extensible cabin portion 12.

As seen in FIGS. 3A and 4A, the fixed end 56 may terminate at the tank 29. At the fixed end 56, the flexible hose 52 may be clamped to a guide tray 60 with clamps 62, however the flexible hose 52 may terminate in other configurations. The guide tray 60 is generally planar and generally parallel with the floor 22, 38, and supports a first portion 64 of the flexible hose 52 that is adjacent the fixed end 56. A fixed chassis member 66 may support the guide tray 60. The clamps 62 orient the fixed end 56 in a first direction, and the first portion 64 of the flexible hose 52 loops, coils or bends about 270-degrees on the guide tray 60 so that the hose becomes generally perpendicular to the fixed end 56 in the first direction.

As seen in FIGS. 3B and 4B, the moveable end 58 may define a drain 68, however the flexible hose 52 may terminate in other configurations. At the moveable end 58, the flexible hose 52 may be clamped with a bracket 70 to a brace 72 that is attached to a moveable chassis member 74.

Between the fixed end 56 and the moveable end 58 is the sliding structure 54, which includes at least one guide bracket 76. Each guide bracket 76 includes at least one roller 78 and at least one bracket structure 80 supporting the roller. In one embodiment, there may be four guide brackets 76 spaced along the length of the flexible hose 52 from the fixed end 56 to the moveable end 58 (see FIG. 2).

The bracket structure 80 is generally square-shaped and attached to the chassis member 66, 74, however other shapes are possible. While the shape and configuration of the bracket structure 80 may vary, the flexible hose 52 is fed through an opening 82 defined by the bracket structure 80. The at least one roller 78 is mounted on the bracket structure 80 and is configured to engage the flexible hose 52. In one embodiment, there are four rollers 78 that extend from the bracket structure 80 to partially and tangentially circumscribe the flexible hose 52, although other numbers of rollers are possible. The rollers 78 facilitate the movement of the flexible hose 52 through the bracket structure 80 when there is movement of the extensible cabin portion 12, and therefore movement of the moveable end 58 with respect to the fixed end 56.

To provide drainage through the flexible hose 52 in the intended direction, the at least one guide bracket 76 is mounted on the chassis members 66, 74 in such a way as to hold the flexible hose 52 at a grade substantially along the length of the flexible hose from the moveable end 58 to the fixed end 56 of at least ⅛-inch per foot, although other slopes are possible. The grade of the flexible hose 52 may be at least ⅛-inch per foot when the extensible cabin portion 12 is in both the extended and the retracted positions. It is possible that the entire length of the flexible hose 52 is held at a grade in both the extended and retracted positions.

Between the fixed end 56 and the moveable end 58, the flexible hose 52 may be disposed through a support tube 84. The support tube 84 may be mounted to have a grade, such as ⅛-inch per foot, however other slopes are possible. The grade provided by the support tube 84 may provide drainage of waste to meet code requirements.

When the extensible cabin portion 12 is in the retracted position, the excess flexible hose 52 is stored on the guide tray 60. When the extensible cabin portion 12 is in the extended position, the excess flexible hose 52 is fed through the guide brackets 76. It is possible that the sliding structure 54 may incorporate other structures that facilitate the movement of the flexible hose 52 in addition to or in place of the guide brackets 76.

With the flexible plumbing assembly 50, the flexible hose 52 and the sliding structure 54 are disposed within the floor 22, 38 of the vehicle 10, which provides more freedom in the floor plan of the vehicle since plumbing fixtures are not limited to locations adjacent walls. Further, since the flexible hose 52 is disposed in the floor 22, 38, the length of the hose is shortened relative to in-wall systems. Further still, the flexible plumbing assembly 50 has a simple construction with a small amount of connections and fittings. The flexible plumbing assembly 50 maintains the grade for drain fittings even though the extensible cabin portion 12 travels laterally and vertically.

What is claimed is:

1. A flexible plumbing assembly for a vehicle having a main cabin portion with an extensible cabin portion that is moveable between a retracted position and an extended position relative to the fixed cabin, the flexible plumbing assembly comprising:
    a flexible hose having a fixed end connected to the fixed cabin portion and a moveable end connected to the movable cabin portion; and
    a sliding structure for facilitating movement of the movable end with respect to the fixed end as the extensible cabin portion moves between the extended and retracted positions, wherein the flexible hose and the sliding structure are disposed in a floor of the extensible cabin portion wherein the sliding structure comprises at least one bracket structure having an opening, wherein the flexible hose is disposed through the opening.

2. The flexible plumbing assembly of claim 1 wherein the flexible cabin portion and the sliding structure are disposed in a floor of the extensible cabin portion and the main cabin portion.

3. The flexible plumbing assembly of claim 1 wherein the sliding structure supports the flexible hose at a grade when the extensible cabin portion is in both an extended position and a retracted position.

4. The flexible plumbing assembly of claim 1 wherein the sliding structure further comprises at least one roller engaging the flexible hose disposed in the opening of the at least one bracket structure.

5. The flexible plumbing assembly of claim 4 wherein the at least one roller comprises four rollers tangentially and concentrically disposed about the flexible hose.

6. The flexible plumbing assembly of claim 1 wherein the sliding structure comprises four bracket structures spaced along the length of the flexible hose.

7. The flexible plumbing assembly of claim 1 further comprising a guide tray supporting a first portion of the flexible hose adjacent the fixed end.

8. The flexible plumbing assembly of claim 7 wherein the flexible hose bends about 270 degrees on the guide tray so that the hose becomes generally perpendicular to the fixed end.

9. The flexible plumbing assembly of claim 1 further comprising a support tube disposed between the fixed end and the moveable end and configured to support the flexible hose.

10. The flexible plumbing assembly of claim 1 wherein the flexible hose is held at a grade of at least ⅛ inch per foot.

11. The flexible plumbing assembly of claim 1 wherein the flexible hose connects rigid drain plumbing in the extensible cabin portion to rigid drain plumbing in the fixed cabin portion.

12. A flexible plumbing assembly for a vehicle having a main cabin portion with an extensible cabin portion that is moveable between a retracted position and an extended position relative to a fixed cabin, the flexible plumbing assembly comprising:

a flexible hose having a fixed end connected to the fixed cabin portion and a moveable end connected to the movable cabin portion; and at least one bracket structure having at least one roller for engaging the flexible hose and facilitating movement of the movable end with respect to the fixed end as the extensible cabin portion moves between the extended and retracted positions, wherein the at least one bracket structure holds the flexible hose at a grade substantially along the length of the flexible hose regardless of the location and movement of the extensible cabin portion between the extended and retracted positions, wherein the flexible hose and the at least one bracket structure are disposed in a floor of the extensible cabin portion.

13. The flexible plumbing assembly of claim 12 wherein the at least one bracket structure holds the flexible hose at a grade of at least ⅛-inch per foot.

14. The flexible plumbing assembly of claim 12 wherein the at least one bracket structure has an opening, wherein the flexible hose is disposed through the opening.

15. The flexible plumbing assembly of claim 14 further comprising at least one roller engaging the flexible hose disposed in the opening of the at least one bracket structure.

16. The flexible plumbing assembly of claim 15 wherein the at least one roller comprises four rollers tangentially and concentrically disposed about the flexible hose.

17. The flexible plumbing assembly of claim 1 further comprising a guide tray supporting a first portion of the flexible hose adjacent the fixed end.

18. A method of facilitating movement of a flexible hose of a flexible plumbing assembly when an extensible cabin portion of a vehicle is moved from a retracted position to an extended position relative to a fixed cabin portion, the method comprising:

disposing the flexible hose and at least one bracket structure within a hollow interior of a floor of the extensible cabin portion;

extending the flexible hose from the fixed end to the moveable end and through at least one opening in the at least one bracket structure; and engaging at least one roller on the flexible hose at the at least one bracket structure.

\* \* \* \* \*